3,474,126
PROCESS FOR PRODUCTION OF HIGH
MOLECULAR WEIGHT DIAMINES
Wolfgang Heydkamp, Erwin Muller, and Hugo Wilms, Leverkusen, Germany, assignors to Farbenfabriken Bayer Aktiengesellschaft, Leverkusen, Germany, a corporation of Germany
No Drawing. Filed Apr. 1, 1966, Ser. No. 539,277
Claims priority, application Germany, Apr. 3, 1965,
F 45,719
Int. Cl. C07c 79/46; C08g 22/08
U.S. Cl. 260—471                                11 Claims

ABSTRACT OF THE DISCLOSURE

A process for the preparation of high molecular weight aromatic diamines containing primary amino groups and urethane groups wherein a compound containing terminal hydroxyl groups such as a polyacetal, a polyester, a polyether and the like and mixtures thereof and having a molecular weight of about 400 to about 6000 is reacted with an azoaryl isocyanate or azoaryl diisocyanate and the resulting reaction product is then reduced in the presence of a hydrogenation catalyst.

---

The invention relates to a process for the preparation of diamines and more particularly, to the preparation of high molecular weight aromatic diamines containing urethane and primary amino groups.

Aromatic compounds carrying nitro groups, such as, for example, compounds of the formula

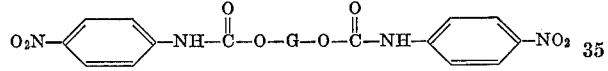

wherein G is a polyalkylene ether radical, can be converted into the corresponding diamines by catalytic hydrogenation of the nitro groups as disclosed, for example, in U.S. Patent 2,888,439. The major disadvantage of such a process resides in the difficulty involved in the preparation of the nitroarylisocyanates, notwithstanding which the products are obtained in only moderate yields. Even further, the water produced as a result of the catalytic hydrogenation reaction, even if present in only small quantities, makes the filtration of the catalyst very difficult. In order to remove the water prior to filtration to obtain a solution that can easily be filtered, a time-consuming procedure must be undertaken which requires complicated and difficult to maintain apparatus.

It is therefore an object of this invention to provide a method for the preparation of high molecular weight aromatic diamines containing urethane and primary amino groups which is devoid of the foregoing disadvantages.

It is a further object of this invention to provide a simple method for the preparation of aromatic diamines which does not require a complex procedure for the preparation of the starting materials.

Another object of this invention is to provide a method for the preparation of an aromatic amine wherein the product is obtained at a high yield and at a high degree of purity.

Still another object of this invention is to provide a method for preparing the aromatic diamines wherein the final conversion to the diamine takes place almost quantitatively.

The foregoing objects and others are accomplished in accordance with this invention, generally speaking, by a method for the preparation of high molecular weight aromatic diamines containing primary amino groups and urethane groups wherein a compound containing two hydroxyl groups and having acetal, carboxylic acid ester and/or ether groups either with or without urethane groups and having a molecular weight of from about 400 to about 6000 is reacted with an azoaryl isocyanate or azoaryl diisocyanate and the resulting product is reduced in the presence of a hydrogenation catalyst. The process of this invention thus simply and easily yields a high molecular weight aromatic diamine in which the terminal aryl radicals are substituted with a primary amino group and are linked to the divalent radical of a polyester, polyether or polyacetal segment through urethane groups, wherein the polyether polyester or polyacetal segment may also contain urethane groups if desired.

Of technical interest is the application of the process of this invention to the preparation of compounds of the formula (I)

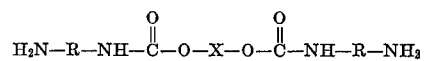

wherein R denotes a divalent arylene radical of the following compounds such as benzene, naphthalene, anthracene, phenanthrene, indene, diphenyl, diphenylmethane or diphenyldimethylmethane (=2,2-diphenyl propane), any of which may be substituted by alkyl groups having 1 to 4 carbon atoms, alkoxy groups having 1 to 4 carbon atoms, chlorine, bromine, or esterified carboxyl groups having 1 to 6 carbon atoms in the ester alkyl group; X denotes divalent segments which theoretically are derived from a polyester, polyether or polyacetal having terminal hydroxyl groups, by the removal of the terminal hydroxyl groups.

Of special interest are compounds of Formula I, in which R denotes a phenylene radical, which may be substituted by methyl groups or chlorine atoms in the ortho-positions and in which X denotes divalent segments which are theoretically derived from a polyether, preferably from a polypropylene glycol ether with terminal hydroxyl groups by the removal of the terminal hydroxyl groups.

The polyester, polyether or polyacetal having terminal hydroxyl groups to be used in the reaction to add the azo isocyanate according to the process of this invention should have a molecular weight between about 400 and about 6000, preferably between 800 and 2500.

Suitable polyesters containing terminal hydroxyl groups are the condensation products of $n$ mols of an aliphatic, aromatic or cycloaliphatic dicarboxylic acid or of a cyclic dicarboxylic acid anhydride with $n+1$ mols of a divalent aliphatic or cycloaliphatic alcohol. The value of $n$ should be so chosen that the molecular weight of the esters lies between about 400 and about 6000, preferably between 800 and 2500.

Examples of suitable dicarboxylic acids or cyclic dicarboxylic acid anhydrides are succinic acid, glutaric acid, adipic acid, maleic acid, fumaric acid, phthalic acid, terephthalic acid, isophthalic acid, tetrahydrophthalic acid, hexahydrophthalic and the like and mixtures thereof.

Examples of suitable dihydric alcohols are ethylene glycol, diethylene glycol, triethylene glycol, 1,2-propylene glycol, 1,3-propylene glycol, dipropylene glycol, tripropylene glycol, butane-1,3-diol, butane-1,4-diol, neopentyl alcohol, hexane-1,6-diol, cyclohexane-1,4-diol, bis-(hydroxyethylated)diphenols, e.g., hydroquinone, resorcinol, 4,4'-dihydroxy-diphenyl-dimethylmethane, 4,4'-dihydroxydiphenyl sulfon, 1,5-dihydroxynaphthalene and the like and mixtures thereof.

Examples of suitable polyethers carrying terminal hydroxyl groups are polyethylene glycols, polypropylene glycols, polybutylene glycols, mixed ethers such as polyethylene-polypropylene glycols, polypropylene-polybutylene glycols and the like and mixtures thereof, preferably polypropylene glycols.

Suitable polyacetals are the condensation products of dihydric aliphatic polyalcohols such as butane-1,3-diol, butane-1,4-diol, hexane-1,6-diol, di-, tri- and polyethylene glycols, di-, tri- and polypropylene glycols, di-, tri- and polybutylene glycols and bis-(hydroxyethylated) diphenols, e.g., hydroquinone, resorcinol, 1,5-dihydroxynaphthalene, 4,4'-dihydroxy-diphenylpropane, 4,4'-dihydroxydiphenylsulphone and the like and mixtures thereof with aldehydes such as formaldehyde, acetaldehyde, benzaldehyde, crotonaldehyde and the like and mixtures thereof.

In addition, the above-mentioned polyesters, polyethers or polyacetals may be extended with diisocyanates and thus contain urethane groups. In such cases, $n$ mols of the diisocyanate are reacted with $n+1$ mols of the polyester, polyether or polyacetal containing 2 hydroxyl groups, with the value of $n$ so chosen that the molecular weights of the end products do not exceed about 6000.

Some suitable diisocyanates which may be used to add urethane groups to the polyesters, polyethers and polyacetals in this chain lengthening reaction are, for example, 1,4- and/or 1,4-phenylene diisocyanate, 2,4- or 2,6-toluylene diisocyanate and mixtures thereof, naphthylene- 1,5-diisocyanates, 4,4'-diphenylmethane diisocyanate, hexamethylene diisocyanate, ethylene diisocyanates, dimeric diisocyanates such as dimers of the foregoing isocyanates, carbodiimides having 2 free terminal NCO groups such as 4,4'-diisocyanato-diphenyl carbodiimide, and the like and mixtures thereof.

To carry out the process of this invention, the above mentioned polyesters, polyethers or polyacetals having terminal hydroxyl groups and either containing or not containing a urethane group or groups, are reacted with azo arylisocyanates or diisocyanates and hydrogenated. The azo arylisocyanates correspond to the formula (II)    R'—N=N—R—N=C=O wherein R has the same meaning as in Formula I and R' denotes a phenyl radical, a substituted phenyl radical which is inert to catalytic hydrogenation, or R—N=C=O.

The azo aryl isocyanates or diisocyanates to be used in the practice of this invention may be prepared by any one of the suitable known methods and may be substituted with alkyl, alkoxy, chloro or bromo or carboxylic acid ester groups. Any suitable alkyl, alkoxy or carboxylic acid ester group may be the substituent, but preferably, the alkyl group should contain 1 to 4 carbon atoms, the alkoxy group should have 1 to 4 carbon atoms and the esterified carboxyl groups should contain from 1 to 6 carbon atoms in the ester group. Some such suitable azo aryl isocyanates and diisocyanates are, for example, 4-isocyanato-3-methyl-phenyl azo-2-ethyl-benzene,
4-isocyanato-2-propyl-phenyl azo-3-butyl-benzene,
3-isocyanato-5-chlorophenyl azo-3-chloro-benzene,
3-isocyanato-6-methoxy-phenyl azo-3-ethoxy-5-chloro-benzene,
4-isocyanato-3-propoxy-phenyl azo-4-butoxy-6-methoxy-benzene,
3-isocyanato-4-carbomethoxy-phenyl azo-2-carboethoxy-benzene,
3-isocyanato-5-butoxy-phenyl azo-4-propoxy-5-chloro-benzene,
2-isocyanato-4-pentoxy-phenyl azo-4-hexoxy-benzene,
4-isocyanato-6-methyl-8-ethyl-naphthyl azo benzene,
3-isocyanato-4-propyl-6-butylnaphthyl azo-2-methyl-benzene,
4-isocyanato-naphthyl azo-3,5-diisopropylbenzene,
4-isocyanato-6-chloro-naphthyl azo-2-chloro-benzene,
2-isocyanato-4-carbomethoxy-5-ethoxy-naphthyl azo benzene,
4-isocyanato-6-methoxy-naphthyl azo naphthalene,
3-isocyanato-4-butoxy-6-carbohexoxynaphthyl azo benzene,
4-isocyanato-6-carbopropoxy-naphthyl azo benzene,
3,5-dimethyl-4-isocyanato phenanthryl-azo-benzene,
4-isocyanato-6-chloro-naphthyl-azo-benzene,
7-chloro-8-isocyanato-10-carbomethoxy-phenanthryl azo benzene,
7-carbomethoxy-indyl azo benzene,
3-chloro-4'-isocyanato-diphenyl azo diphenyl-methane,
4'-isocyanato-5'-chlorodiphenyl azo dimethyl-diphenyl-methane,
6'-isocyanato-diphenyl azo-2,3-dimethyl-benzene,
2,2'-dimethyl-6'-methoxy-4'-isocyanato-diphenyl-methane azo benzene,
3-carbomethoxy-3'-chloro-4'-isocyanato-diphenyl-methane azo-2-methyl naphthalene,
5-butoxy-6-chloro-4'-isocyanato-5'-butoxy-diphenyl-methane azo-4-naphthalene,
3'-carbomethoxy-4'-isocyanato-diphenyl-methane azo-8-methyl-phenanthrene,
4'-isocyanato-diphenyl dimethyl-methane azo benzene,
4'-isocyanato-diphenyl-dimethyl-methane azo toluene,
4-isocyanato-phenyl azo benzene,
4-isocyanato-naphthyl azo toluene,
4-isocyanato-anthryl azo benzene,
8-isocyanato-phenanthryl azo xylene,
6-isocyanato-indyl azo benzene,
4'-isocyanato-diphenyl azo diphenyl,
4'-isocyanato-diphenyl-methane azo-4-chloro-benzene,
4'-isocyanato-dimethyl-diphenyl-methane azo benzene,
4-isocyanato-3-methylphenyl azo-2-ethyl-4-isocyanato-benzene,
4-isocyanato-2-propylphenyl azo-4-isocyanato-benzene,
3-isocyanato-5-chloro-phenyl azo-3-chloro-5-isocyanato-benzene,
3-isocyanato-5-methoxy-phenyl azo-3-ethoxy-5-chloro-4-isocyanato-benzene,
4-isocyanato-2-propoxy-phenyl azo-4-butoxy-5-isocyanato-benzene,
3-isocyanato-4-carbomethoxy-phenyl azo-3-carboethoxy-4-isocyanato-benzene,
4-isocyanato-5-butoxy-phenyl azo-3-isocyanato-4-propoxy-5-chloro-benzene,
2-isocyanato-4-pentoxy-phenyl azo-4-hexoxy-2-isocyanato-benzene,
4-isocyanato-5-methyl-8-ethyl-naphthyl azo-4-isocyanato-benzene,
3-isocyanato-4-propyl-6-butyl-naphthyl azo-2-methyl-4-isocyanato-benzene,
4-isocyanato-naphthyl azo-3-propyl-4-isocyanato-benzene,
4-isocyanato-6-chloro-naphthyl azo-2-chloro-4-isocyanato-benzene,
2-isocyanato-4-carbomethoxy-naphthyl azo-4-isocyanato-benzene,
4-isocyanato-6-methoxy-naphthyl azo-4-isocyanato-benzene,
3-isocyanato-4-butoxy-naphthyl azo-6-isocyanato-benzene,
4-isocyanato-6-carbo-propoxy-naphthyl azo-4-isocyanato-toluene,
3,5-dimethyl-4-isocyanato-phenyl azo-isocyanato-xylene,
4-isocyanato-6-chloro-naphthyl azo-isocyanato-chloro-benzene,
4-isocyanato-6-methyl-anthryl azo-4-isocyanato-benzene,
2-chloro-4-isocyanato-anthryl azo-2-chloro-3-isocyanato benzene,
4-methoxy-8-isocyanato-phenanthryl azo-3-isocyanato-benzene,
2-methyl-4-methoxy-6-isocyanato-indyl azo-5-isocyanato-benzene,
5-chloro-indyl azo-7-isocyanato-naphthalene,
2-butyl-3-chloro-4'-isocyanato-diphenyl azo-4'-isocyanato-diphenyl-methane,
6'-isocyanato-diphenyl azo-2,3'-dimethyl-4'-isocyanato-diphenyl,
2,2'-dimethyl-5,5'-dimethoxy-4'-isocyanato-diphenyl-methane azo-4-isocyanato-benzene, 3-carbomethoxy-3'-chloro-4'-isocyanato-diphenyl-methane azo-2-methyl-4-isocyanato-naphthalene,
5-butoxy-6-chloro-4'-isocyanato-diphenyl-methane azo-9-isocyanato-anthracene,
4'-isocyanato-diphenyl-methane azo-4-isocyanato-9-methyl-phenanthrene,
4'-isocyanato-diphenyl-dimethyl-methane azo-4-isocyanato-benzene,
4'-isocyanato-diphenyl-dimethyl-methane azo-4-isocyanato-diphenyl-dimethyl-methane,
4-isocyanato-phenyl azo-4-isocyanato-benzene,
4-isocyanato-naphthyl azo-4-isocyanato-naphthalene,
isocyanato-anthryl azo-9-isocyanato-anthracene,
8-isocyanato-phenanthryl azo-8-isocyanato-phenanthrene,
6-isocyanato-indyl azo-6-isocyanato-indene,
4'-isocyanato-diphenyl azo-4'-isocyanato-diphenyl,
4'-isocyanato-diphenyl-methane azo-4'-isocyanato-diphenyl-methane,
4'-isocyanato-dimethyl-diphenyl-methane azo-4'-isocyanato-dimethyl-diphenyl-methane and the like and mixtures thereof.

Of special interest are compounds of the Formula II in which R' denotes a phenyl and R a phenylen radical, which may be substituted by methyl groups or chlorine atoms in the ortho-positions.

Two mols of azoisocyanate or one mol of azo-diisocyanate are required per mol of the hydroxyl containing compound described hereinbefore. In practice, it is advantageous to work with a slight excess of the isocyanate component such as, for example, an excess of from about 0.5 to about 2% by weight.

The addition reaction between the azoisocyanate and the hydroxyl containing compound can be carried out at temperatures of from about 10° C. to about 170° C., but preferably between about 60° C. and about 130° C.

The addition reacting between the azo aryl monoisocyanate and the hydroxyl-containing compound, and the subsequent hydrogenation may or may not be carried out in a solvent, as desired. Where azo aryldiisocyanates are used, however, a solvent must be employed, especially during the hydrogenation step. Some solvents suitable for this purpose are, for example, benzene, toluene, xylene, chlorobenzene, dichlorobenzene, dioxane or tetrahydrofuran or generally any solvent which does not interfere with the addition or hydrogenation reaction.

The removal of the azo group by hydrogenation proceeds unexpectedly smoothly with noble metal catalysts such as palladium, ruthenium or platinum, for example, or with nickel or cobalt catalysts or mixed nickel/cobalt catalysts, any of which may be used either in the pure metal or its oxides form, if desired, adsorbed on carrier materials. The reduction with Raney nickel is of technical interest.

The reduction can be carried out at from about 30° C. to about 200° C., but preferably from about 100° C. to about 140° C., and at a hydrogen pressure between about 0 and about 200 atmospheres gauge, but preferably between about 50 and about 200 atmospheres gauge. The quantity of catalysts used is from about 2 to 10% by weight based on the amount of the material to be hydrogenated, but preferably from about 2 to about 5% by weight.

In order to separate the hydrogenation products, the catalyst is first filtered off, an operation which is easily and quickly carried out as a result of this unique process in which no water forms to interfere with this operation. Any solvent present is then distilled off. In cases where azo aryl monoisocyanates are used, hydrogenation gives rise to an aryl amine which is also distilled off; where azo aryl diisocyanates are used, no aryl amine is formed, obviating the need for this separation step and consequently greatly simplifying the preparation of the higher molecular weight aromatic diamines.

The yields obtained from the process of this invention consistently exceed 90% by weight of the theoretical yields while the aromatic primary amino end group content shows conversion consistently in excess of 96%. This finding is extremely surprising since it was to be expected that the hydrogenation reaction to obtain higher molecular weight compounds would proceed less smoothly and less uniformly and with considerably lower yields. It is well known to anybody skilled in the art that low molecular weight compounds can be hydrogenated quite generally with greater ease and more completely. Under the more energetic conditions of pressure and temperature, which are applied in the process of this invention, the high molecular weight compounds had to be expected to undergo molecular rearrangements and cleavages, since urethane groups are not very stable to high temperatures. Another surprising feature is that no amidation of the urethane groups takes place under the hydrogenation conditions employed.

The diamines obtained according to the invention can be used directly as age-resistors. In addition, they represent valuable starting materials for the diisocyanate polyaddition process. High grade elastomers with excellent resistance to hydrolysis and good technical properties are obtained in casting and spraying processes from the diamines prepared by the novel process of this invention.

The invention is further illustrated but not limited by the following examples in which all parts and percentages are by weight unless otherwise specified.

PREPARATION OF THE STARTING MATERIAL

A suspension of about 395 parts (2.0 mols) of p-aminoazo benzene in about 1.5 liters of chlorobenzene is added to at least about 300 parts of phosgene in about 1.5 liters of anhydrous chlorobenzene at a temperature below about +5° C. and the mixture is stirred for about 3 hours at about room temperature. Phosgene is passed through the mixture which is heated to boiling at the same time and this temperature is maintained for about 3 to about 4 hours. A clear, dark red solution is obtained. Excess phosgene and dissolved hydrogen chloride are removed in a stream of nitrogen at about 100° to about 80° C. The solution contains about 440 parts (98.6% by weight of the theoretical amount) of p-isocyanato-azobenzene. Melting point about 95° to 96° C.

Example 1

About 440 parts of p-isocyanato-azobenzene dissolved in about 1.5 liters of chlorobenzene (1.97 mols azobenzene derivative) are treated with about 975 parts of polypropylene glycol ether having a molecular weight of about 1000, and heated for about 2 hours at about 110° C. In the course of the subsequent hydrogenation at about 120° C. under about 150 atmospheres gauge in the presence of Raney nickel on kieselguhr, the polyether diamine is formed in a yield of over 98% by weight. The aniline formed in the course of the hydrogenation and balance of the solvent are removed by distillation at about 125° C./about 0.1 mm. Hg, and a dark brown, highly viscous reaction product is obtained which, after end group analysis, is found to have the molecular weight of about 1280 (calculated 1265). Thus at least about 98.5% of the end groups are present in the form of aromatic $NH_2$ groups.

Example 2

About 892 parts (1.0 mol) of polyethylene glycol ether is carefully dehydrated and cooled to about 70° C.; about 447 parts (2.0 mols) of 4-isocyanato-azobenzene are added. After a further two hours at about 110° C. to about 115° C., the dark red melt is taken up in about 1.5 liters of dioxane and hydrogenated at about 130° C. under a hydrogen pressure of about 120 atmospheres gauge in the presence of a Raney nickel catalyst. After removal of the solvent and the aniline formed as by-product, the filtered material is found to have a molecular weight of about 1190 (calculated 1160). The yield amount is about 93% by weight of the theoretical.

Example 3

A solution of about 447 parts (2.0 mols) of p-isocyanato-azo-benzene in about 3 liters of chlorobenzene is treated with about 625 parts of glycol adipate having an OH number of about 179 and heated for about 2 hours at about 120° C. Hydrogenation proceeds smoothly at about 100° C. under a pressure of about 150 atmospheres gauge in the presence of Raney nickel. The product, when diluted with about 500 ml. of methanol, yields after filtration, removal of the solvent and removal of the aniline by distillation, a dark brown polyester having a molecular weight of about 900 (calculated 892) in which about 97% of the end groups are aromatic amino end groups. The yield is about 94% of the theoretical.

Example 4

About 1750 parts of a carefully dehydrated mixed ester of adipic acid, butanediol and neopentyl glycol (OH number about 64) are added to about 503 parts (2.0 mols) of 4-isocyanato-2′,3-dimethylazobenzene in about 4 liters of anhydrous chlorobenzene and the mixture heated for about two hours at about 120° C. The aminopolyester is formed by hydrogenation in the presence of about 10% Raney nickel at about 110° C. under about 120 atmospheres gauge pressure. The product of the process, freed from catalyst, solvent and toluidine is a dark brown liquid which slowly solidifies to a soft waxy consistency. Yield: about 95% of the theoretical. Molecular weight determinations by end group analysis indicate a molecular weight of about 2110 (calculated 2045) and over about 96% of aromatic amino end groups.

Example 5

After dehydration at about 120° C. to about 130° C./12 mm. Hg, about 252 parts (1.0 mol) of 4-isocyanato-2′,3-dimethylaminobenzene are added to about 1,400 parts of polybutylene glycol ether (OH number 40) and the mixture stirred for about 2 hours at about 120° C. under about 100 atmospheres gauge of hydrogen pressure in the presence of Raney nickel. The product of the process, filtered and freed from solvent and o-toluidine, is dark brown, highly viscous and has a molecular weight of about 3035 (calculated 3095). About 98% of the analytically determined end groups are present as aromatic $NH_2$ groups. The yield is about 95% by weight of the theoretical.

Example 6

About 500 parts of polypropylene glycol ether (molecular weight about 1000) are added dropwise in the course of about 30 minutes to a solution heated to about 100° C. of about 265 parts (1.0 mol) of 4,4′-azobenzene-diisocyanate, and the mixture is heated for about 3 hours at about 110° C. Hydrogenation takes place at about 140° C. under a hydrogen pressure of about 150 atmospheres gauge in the presence of about 10% of Raney nickel catalyst. The dark brown reaction product, filtered and freed from solvent, is obtained in a yield of over about 90% by weight and has a molecular weight of about 1290 (calculated 1265).

Example 7

When about 133 parts (0.50 mol) of 4,4′-azobenzene-di-isocyanate in about 0.5 liter of o-dichlorobenzene and about 537 parts of polybutylene glycol ether (OH number 52) in about 0.5 liter of o-dichlorobenzene are reacted, after about 3 hours heating at about 125° C., a dark red viscous solution is obtained. The solution is easily hydrogenated with Raney nickel at about 140° C. and at a hydrogen pressure of about 150 atmospheres gauge. The product, when freed from solvent, has a molecular weight of about 2370 (calculated 2420); about 99.5% of the end groups are aromatic amino groups. The yield is about 93.5% by weight of the theoretical.

Example 8

Into the dehydrated melt of 700 parts of polybutylene glycol ether of OH number 40 is added a solution consisting of 110 parts (0.5 mol) of 4-azobenzene-isocyanate dissolved in 1.0 liter chlorobenzene and stirred for 2 hours at 110° C. After addition of 60 parts of nickel catalyst on kieselguhr rapid hydrogenation occurred at a temperature of 110° to 125° C. under a hydrogen pressure of 108 excess atmospheres.

The product of the process freed from catalyst, solvent and aniline is dark brown. Yield: 96% by weight of the theoretical. Molecular weight determinations by end group analyses indicate a value of 3010 (calculated 3070) and over 95% of aromatic amino end groups.

Example 9

A solution of 273 parts (1.0 mol) of 4-phenyl-azo-naphthylisocyanate-1 in 1.0 liter chlorobenzene is treated with 500 parts of dehydrated polypropylene glycol ether of OH number 11 and heated for 4 hours at 110° C. After addition of 70 parts of nickel catalyst on kieselguhr is hydrogenated at a temperature of 100° to 125° C. under a hydrogen pressure of 120 excess atmospheres. After removal of the catalyst by filtration, the solvent and the aniline formed in the process is removed by distillation up to a temperature of 130° C. under a pressure of 0.1 mm. Hg. The reddish brown end-product has a molecular weight of 1380 (calculated 1363) and naphthylamino end groups. The yield is 89% by weight of the theoretical.

Example 10

370 parts (1 mol) of technically pure 3-azo-(2′,4′-dichloro-phenyl-4-diphenylisocyanate is dissolved in o-dichlorobenzene (2.5 liters) at 100° C. To this is added the dehydrated melt consisting of 2120 parts of a reaction product obtained by heating 2000 parts of polypropylene glycol ether (OH number 56) with 125 parts of 4,4′-diphenylmethane-diisocyanate for 1.5 hours at 120° to 125° C. The reaction mixture is heated for 4 hours at 120° C. and hydrogenated at 120° C. under a pressure of 80 to 110 excess atmospheres of hydrogen, in the presence of 40 parts of palladinized charcoal (5%) as catalyst. After removal of the catalyst by filtration, the solvent and the 2,4-dichloro-aniline distilled off at 145° to 150° C. under a pressure of 0.1 mm. Hg. The final product is a rather viscous dark brown product of a molecular weight of about 4800 (calculated 4670). The yield amounts to 91% by weight of the theoretical.

Example 11

150 parts of polypropylene glycol ether is carefully dehydrated. 95 parts (0.3 mol) of 2′,4′-dichloro-3-methoxy-azobenzene-isocyanate-(4) is added and stirred for 1.5 hours at 125° C. The reaction mixture dissolved in 0.3 liter tetrahydrofuran is hydrogenated at 115° to 130° C. under a pressure of 100 excess atmospheres of hydrogen, in the presence of 25 parts of palladinized charcoal as catalyst. After removal of the catalyst by filtration, the 2,4-dichloro-aniline distilled off at 140° to 150° C. under a pressure of 0.1 mm. Hg. The yields of the final product amounts to 90% by weight of the theoretical. The dark brown highly viscous end-product has a molecular weight of about 1430 (calculated 1330).

Example 12

A solution of 253 parts (0.75 mol) of 2′,4′-dichloro-2-ethoxy-4-isocyanato-azobenzene dissolved in 1 liter chlorobenzene is treated with 375 parts of polypropylene glycol ether of OH number 112 and heated for 2.5 hours at 120° C. After addition of 62.5 parts of nickel catalyst on kieselguhr is hydrogenated at a temperature of 140° C. under a hydrogen pressure of 150 excess atmospheres.

After removal of the catalyst and the solvent, the 2,4-dichloro-aniline distilled off up to a temperature of 150° C. and a pressure of 0.1 mm. Hg. The end-product has a molecular weight of about 1400 (calculated 1260). The yield amounts to 84% by weight of the theoretical.

Example 13

A solution of 263 parts (0.8 mol) of 2',4'-dichloro-3-chloro-4-isocyanato-azobenzene in 1 liter tetrahyro-furan free from water is treated with 400 parts of polypropylene glycol ether of the OH number 112 for 4 hours at boiling temperature. After addition of 40 parts of palladinized charcoal the reaction mixture is hydrogenated at 120° to 140° C. under a pressure of 150 excess atmospheres of hydrogen. After removal of the catalyst and the solvent, the 2,4-dichloro-aniline distilled off at about 150° C. under a pressure of 0.1 mm. Hg. The dark brown highly viscous end-product has a molecular weight of about 1400 (calculated 1340). The yield amounts to 92.5% by weight of the theoretical.

Example 14

Into the dehydrated melt of 1600 parts (0.4 mol) of polybutylene and glycol ether is added 265 parts (0.81 mol) of 2',4'-dichloro-3-chloro-4-isocyanato-azobenzene at a temperature of 100° to 110° C. and stirred at this temperature for 4 hours. After addition of 75 parts of palladinized charcoal is hydrogenated at 120° to 140° C. under a pressure of 100 excess atmospheres of hydrogen. The reaction product is dissolved in 2 liters dioxane and removed from the catalyst. Thereafter the reaction product is treated as shown in Example 13. The yield amounts to 94% by weight of the theoretical. The light brown end-product, which crystallizes at room temperature has a molecular weight of 3300 (calculated 3140).

Example 15

Into the dehydrated melt of 715 parts (0.5 mol) of polyacetal are added 224 parts (1.0 mol) of p-isocyanato-azobenzene within 10 minutes at 100°–110° C. The temperature is kept for 4 hours at 110° C. The polyacetal can be prepared by condensation reaction of a mixture of tri- and tetraethyleneglycol with excess paraformaldehyde in presence of catalytic amounts of sulfuric acid. The azobenzene-addition product is dissolved in 1.0 liter of toluene, 25 parts of Raney-nickel is added and hydrogenation is carried out at 120°–125° C. under a hydrogen pressure of 100 excess atmospheres. After filtration the work up procedure is similar to the examples above. The yield amounts to 95.5% by weight of a dark-brown material with molecular weight 1660 (calculated 1698) and with tendency to crystallize.

Example 16

715 parts (0.5 mol) of a dehydrated melt of polyacetal (see Example 15) are reacted with 252 parts (1.0 mol) of 4-isocyanato-2',3-dimethylazobenzene in 1.0 litre of chlorobenzene for 3 hours at 120° C. One hydrogenates at 125° C. under 100 atü. of hydrogen pressure in the presence of about 30 parts of nickel oxide on siliceous earth as support. After removal of the catalyst by filtration, the solvent and the o-toluidine are distilled off in a thin-layer evaporator. The dark-broken reaction product crystallizes slowly and has a molecular weight of 1715 (calculated 1725), determined by means of filtration with n/10 perchloric acid in a pure acetic acid medium.

EXAMPLE OF APPLICATION 1

About 26.5 parts of hexamethylene diisocyanate are added at about 30° to about 35° C., with vigorous stirring, to about 200 parts of the starting material having an amine number of about 87.5 and obtained according to Example 1. The reaction proceeds with considerable rise in temperature to produce an elastomer which can readily be rolled into a sheet or pressure molded into any desired shaped articles. The articles have geen physical properties and are distinguished by excellent elasticity; see Column 1, Table 1.

EXAMPLE OF APPLICATION 2

From about 200 parts of the product prepared according to Example 1 and about 27.5 parts of hexamethylene diisocyanate there is obtained by the process indicated above, an elastomer which has the properties indicated in Column 2 of Table 1.

EXAMPLE OF APPLICATION 3

About 16.6 parts of toluylene-2,4-diisocyanate are added with vigorous stirring at about 30° C. to about 35° C. to about 200 parts of a product having an OH number of 35 prepared according to Example 4, and the crude product is pressure molded into shaped articles. The physical properties of the elastomers are shown in Column 3, Table 1.

TABLE 1

|  | Column 1 | Column 2 | Column 3 |
| --- | --- | --- | --- |
| Tensile strength, kg./cm.² | 98 | 102 | 195 |
| Elongation at break, percent | 135 | 136 | 85 |
| Structural rigidity, kg | 24 | 29 | 17 |
| Permanent elongation, percent | 3 | 2.5 | 3 |
| Elasticity, percent | 68 | 73 | 51 |
| Shore hardness A (20°) | 80 | 81 | 68 |

EXAMPLE OF APPLICATION 4

About 114 parts of 4,4'-diphenylmethane-diisocyanate containing carbodiimide are added in one lot to about 400 parts of the product prepared according to Example 3 (amine number 124.5) and complete mixing of the components is effected by means of a very high speed stirrer (Thorax stirrer). The material which solidifies within about 2 minutes, is eminently suitable for rolling. Molded articles prepared from the crude rolled sheet have the physical properties shown in Table 2. The measurements for determining these properties are carried out directly after the molding process (Column 1) and after about 24 hours' storage of the molded articles at about 110° C. (Column 2).

TABLE 2

|  | Column 1 | Column 2 | Column 3 | Column 4 |
| --- | --- | --- | --- | --- |
| Tensile strength, kg./cm.² | 218 | 245 | 141 | 278 |
| Elongation at break, percent | 101 | 70 | 45 | 65 |
| Elasticity, percent | 41 | 39 | 38 | 35 |
| Shore hardness A (20° C.) | 89 | 91 | 87 | 91 |
| DIN abrasion | 60 | 41 |  |  |

Column 3 gives the physical properties of the described elastomer determined after about 7 days ageing in hot water at about 90° C. and at about 95% relative humidity; Column 4 gives the physical properties of the molded articles determined after about 21 days' ageing in a current of hot air at about 125° C.

Although the invention has been described in considerable detail in the foregoing for the purpose of illustration, it is to be understood that variations can be made by those skilled in the art without departing from the spirit and scope of the invention except as set forth in the claims.

What is claimed is:

1. A process for the production of high molecular weight aromatic diamines containing primary amino groups and urethane groups, which comprises reacting a hydroxyl containing compound selected from the group consisting of a polyacetal, a polyester, a polyether or mixtures thereof, with from about an equivalent amount to about a 2% by weight excess amount of an azo arylisocyanate or diisocyanate at a temperature of from about 10° C. to about 170° C. and reducing the reaction product in the presence of a hydrogenation catalyst, the group member having a molecular weight of from about 400 to about 6000 and containing two hydroxyl groups.

2. The process of claim 1 wherein the group member contains urethane linkages.

3. The process of claim 1 wherein the azo isocyanate has the formula

R'—N=N—R—N=C=O wherein R is a divalent radical of the compounds selected from the group consisting of substituted and unsubstituted benzene, naphthalene, anthracene, phenanthrene, indene, diphenyl, diphenylmethane and diphenyldimethylmethane and R' is a substituted or unsubstituted phenyl radical or R—N=C=O.

4. The process of claim 3 wherein the substituents R and R' are substituted with a member selected from the group consisting of alkyl, alkoxy, chloro or carboxylic acid ester groups wherein the alkyl groups and the alkoxy groups contain from 1 to 4 carbon atoms and the esterified carboxyl groups contain from 1 to 6 carbon atoms in the ester group.

5. The process of claim 1 wherein two mols of azo monoisocyanate are reacted per mole of the hydroxyl containing compound.

6. The process of claim 1 wherein one mol of azodiisocyanate is reacted per mol of the hydroxyl containing compound.

7. The process of claim 1 wherein the hydrogenation catalyst is selected from the group consisting of palladium, platinum, ruthenium, nickel and cobalt at concentrations of from about 2 to about 10% by weight of the reaction product.

8. The process of claim 1 wherein the hydrogenation is carried out at a temperature of from about 30° C. to about 200° C. at a pressure of from about 0 to about 200 atmospheres gauge.

9. The process of claim 1 wherein the hydrogenation is carried out while the reaction product is dissolved in an inert organic solvent therefor.

10. The method of claim 1 wherein the aromatic diamine being prepared has the formula

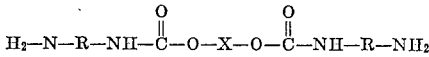

wherein R denotes a divalent radical of the compounds selected from the group consisting of benzene, naphthalene, anthracene, phenanthrene, indene, diphenyl, diphenylmethane and diphenyldimethylmethane and X denotes a divalent segment which is derived from a member selected from the group consisting of a polyether, a polyester and a polyacetal with terminal hydroxyl groups having a molecular weight between 400 and 6000 by removal of the terminal hydroxyl groups.

11. A polyurethane diamine of the formula

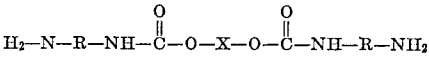

in which R denotes a divalent arylene radical, which may be substituted by a substituent selected from the group consisting of alkyl groups having 1 to 4 carbon atoms, alkoxy group having 1 to 4 carbon atoms, chlorine, bromine, esterified carboxyl groups having 1 to 6 carbon atoms in the ester group and X denotes a divalent segment which is derived from a member selected from the group consisting of a polyester and polyacetal with terminal hydroxyl groups having molecular weights between 400 and 6000 by removal of the terminal hydroxyl groups.

References Cited

UNITED STATES PATENTS 2,888,439   5/1959   Simons _____ 260—77.5

LORRAINE A. WEINBERGER, Primary Examiner

L. A. THAXTON, Assistant Examiner

U.S. Cl. X.R.

260—77.5